June 2, 1942.　　F. A. FIRESTONE　　2,285,151
APPARATUS FOR MEASURING CAPACITY
Filed Oct. 6, 1939　　3 Sheets-Sheet 1
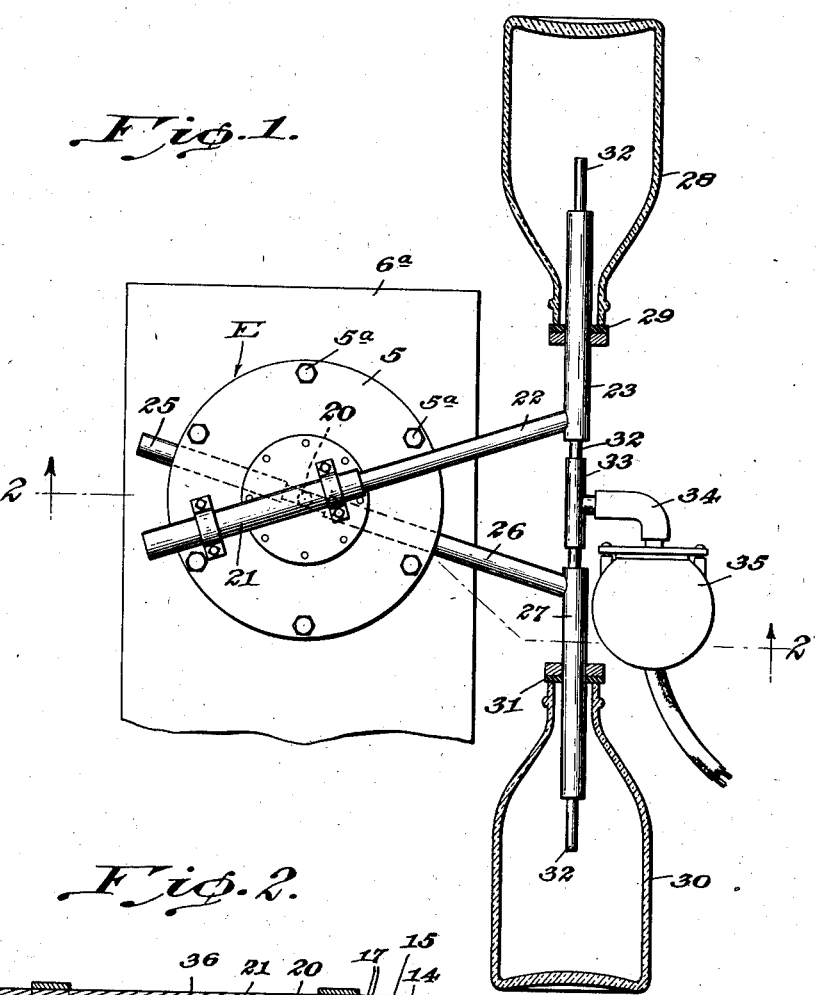
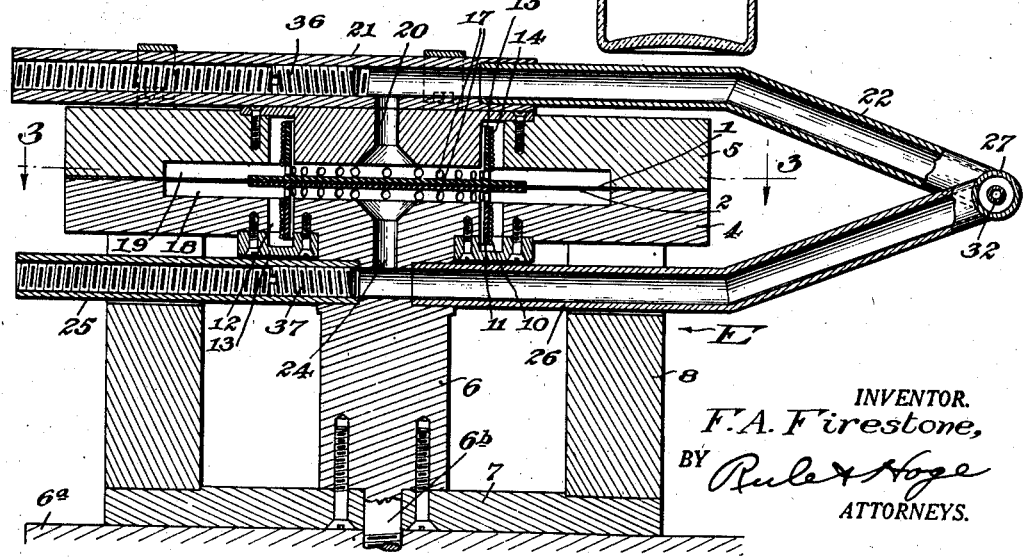
INVENTOR.
F. A. Firestone,
BY
ATTORNEYS.

June 2, 1942. F. A. FIRESTONE 2,285,151
APPARATUS FOR MEASURING CAPACITY
Filed Oct. 6, 1939 3 Sheets-Sheet 2

INVENTOR.
F. A. Firestone,
BY
ATTORNEYS.

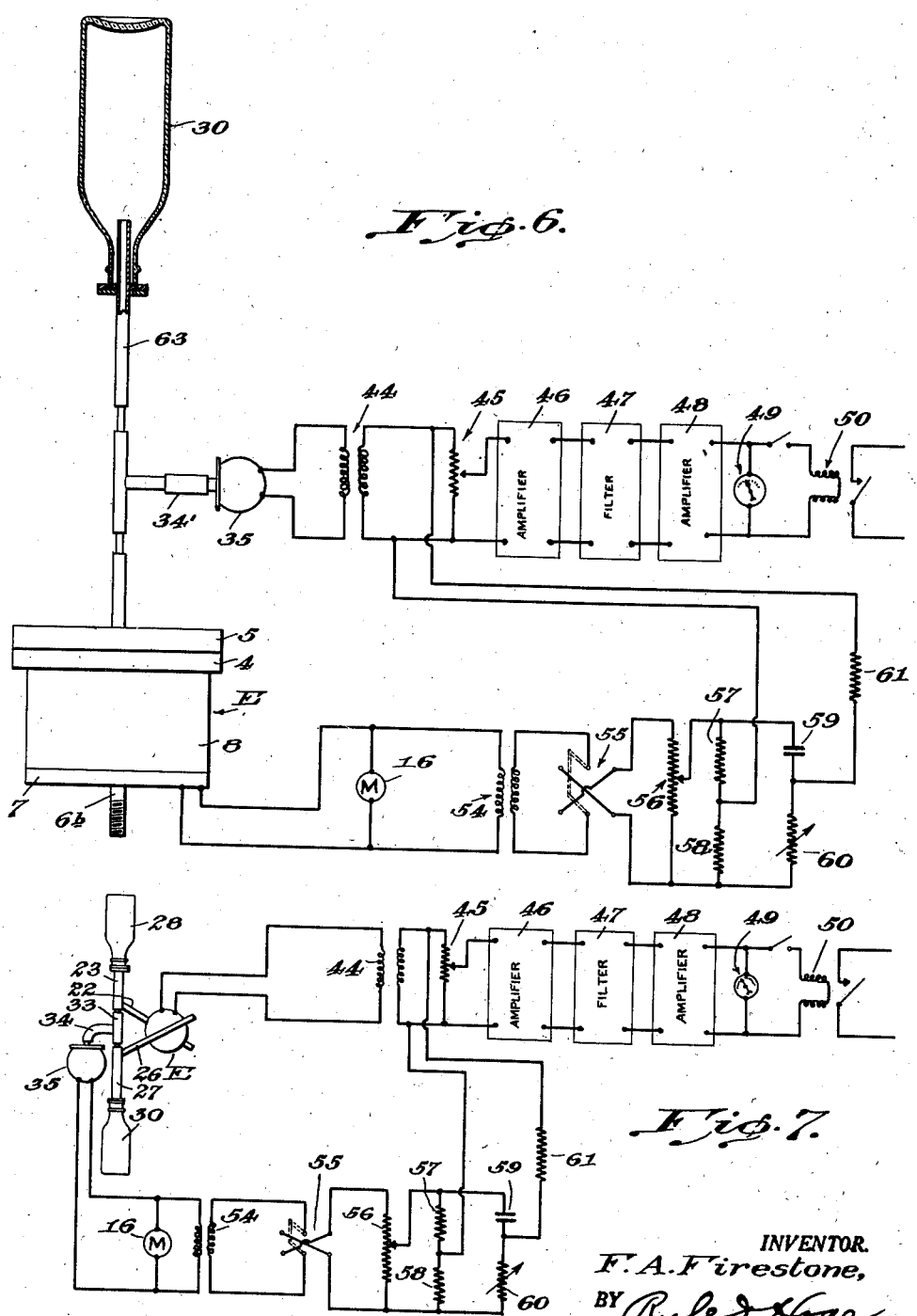

Patented June 2, 1942

2,285,151

UNITED STATES PATENT OFFICE 2,285,151

APPARATUS FOR MEASURING CAPACITY

Floyd A. Firestone, Ann Arbor, Mich., assignor to Owens-Illinois Glass Company, a corporation of Ohio Application October 6, 1939, Serial No. 298,178

30 Claims. (Cl. 73—51)

My invention pertains to a device for accurately indicating the capacity or volume within a closed space which may be of irregular form. Since the medium for this indication is not a liquid, which would leave the container wet, but rather the pressure fluctuations in the contained air, which do not contaminate the container, my invention is adaptable to the rapid routine inspection of closed containers as to their capacity.

An object of my invention is the measurement or indication of the capacity or volume within a space completely enclosed by a rigid container, said measurement to be capable of an accuracy of 0.1% or better.

A further object of my invention is to provide apparatus for indicating the capacity of a closed container with great rapidity and preferably within a fraction of a second after the container is attached to said device, to the end that routine automatic rejection of off-capacity containers becomes commercially practicable.

A further object of my invention is to provide a device which will quickly and accurately indicate the capacity of a closed container without contaminating said container by filling it with liquid or other ponderable matter.

A further object of my invention is the accurate indication of the difference in capacity between a container of unknown capacity and a container designated as of standard capacity, regardless of whether said unknown be either larger or smaller than said standard capacity.

Further objects of my invention will become apparent from the following description taken in connection with the drawings in which:

Fig. 1 is an elevation of the mechanical parts of an apparatus embodying a preferred form of my invention;

Fig. 2 is a section at the line 2—2 on Fig. 1, looking in the direction indicated by the arrows;

Fig. 6 is a diagrammatic view similar to Fig. 5 but showing an alternative construction; and Fig. 7 is a diagrammatic view illustrating a modified arrangement of parts in which the functions of the microphone and the source of air oscillations are interchanged.

Figure 3:
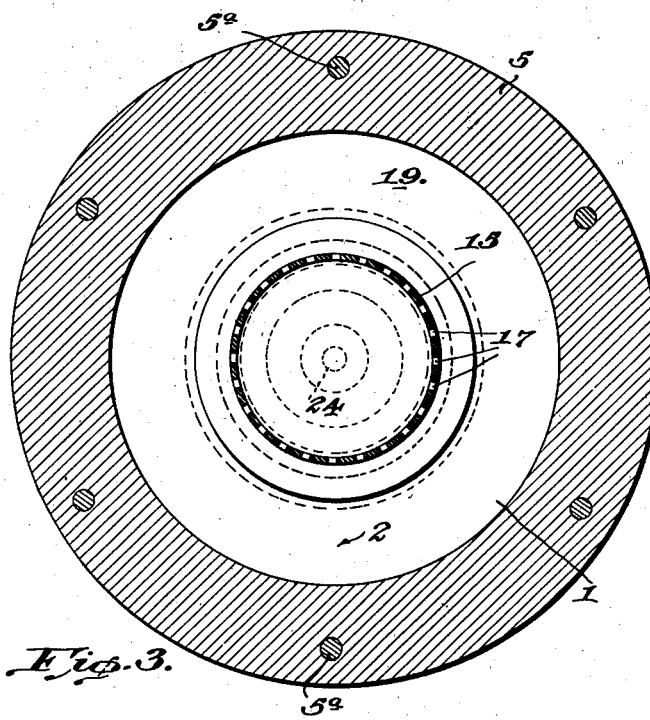
Fig. 3 is the section at the line 3—3 on Fig. 2.
Figure 4:
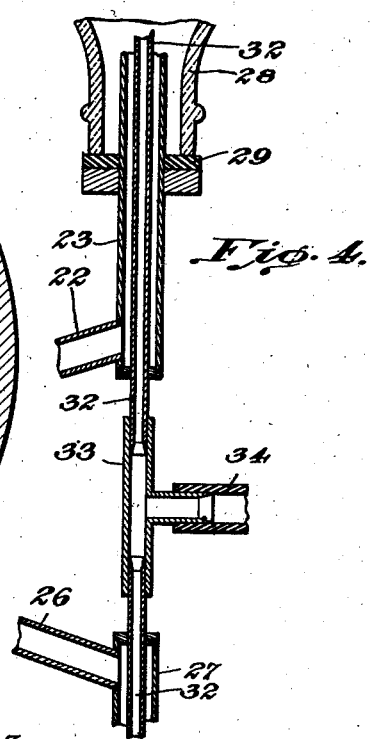
Fig. 4 is a fragmentary sectional elevation of a portion of the mechanism shown in Fig. 1.

My invention broadly is based on the principle of determining the capacity of a container through measuring the change in the pressure of the air in the container which is consequent upon the introduction of a given small mass of air into the container. It is well known, according to Boyle's law, that the pressure of a given mass of gas is inversely proportional to the volume which it occupies, if the temperature remains constant; and, since a gas expands until it fills the entire container to which it has access, the pressure of a given mass of gas is inversely proportional to the capacity of the container. Furthermore, it follows that, if we start with the container full of air at atmospheric pressure, and then force a given increment of mass of air into the container, the increment of pressure thus created will be inversely proportional to the capacity of the container. Thus the capacity of the container may be found by measuring the increment of pressure consequent upon the introduction of a given mass of air into the container.

However, rugged pressure indicating devices suitable for factory use are not sufficiently accurate to permit the determination of the capacity of a container to that degree of accuracy contemplated by my invention, namely, 0.1% or better. Consequently, the present invention contemplates extending the above principle by providing a standard container of known capacity approximately equal to the capacity of the container to be measured; introducing an equal increment of mass of air into each container, and measuring the difference between the resulting pressure increments, this difference being proportional to the difference in the capacities of the two containers. Since the one container is of known capacity, a knowledge of the difference of capacities immediately gives the capacity of the unknown. However, rugged and sensitive instruments for measuring this difference between the two pressure increments are not too easy to provide, so I have still further extended the above principle by providing an oscillatory flow of mass of air into and out of each container at a frequency of roughly 20 cycles per second so that it is practical to measure the difference in the pressure increments by means of a pressure microphone and amplifier such as are used in accoustical investigations, there being no difficulty in obtaining such a microphone-amplifier combination as will operate a relay in response to a pressure fluctuation of one hundred millionth of an atmosphere. By this improved principle, the capacity of a container can be determined with great accuracy. Thus, for example, in measuring the capacities of bottles or the like for commercial use, an accuracy of 0.1% or better is readily obtained and is adequate for standard requirements.

A preferred form of my invention as applied to the routine inspection of bottles for capacity, is illustrated in Figs. 1 to 5. For producing an oscillatory flow of air an electromagnetic vibrator E is provided which comprises a diaphragm 1, the central portion of which is comparatively thick and therefore rigid. As shown, this thickened portion is made up of laminations including disks on opposite sides of the comparatively thin diaphragm which provides a compliant marginal portion 2. The diaphragm is clamped in position between a lower annular iron plate or ring 4 and an upper annular plate or ring 5 of non-magnetic material. The plate 4 as shown surrounds the upper end of a center post 6 to which is bolted a plate 7 of magnetic material. A permanent magnet ring 8 completes the magnetic circuit between the plate 7 and the plate 4, and serves to maintain a magnetic field in an annular space 12 between plate 4 and center post 6. The electromagnetic vibrator is removably mounted on a support 6a by means of a screw-threaded extension 6b of the center post 6. The plates 4 and 5 are clamped together by bolts 5a.

Figure 5:
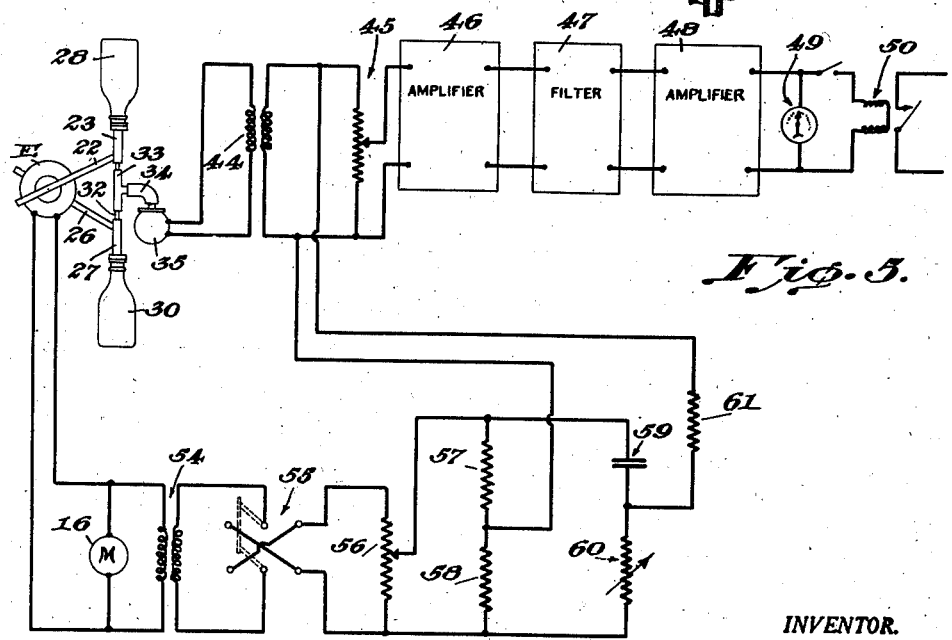
Fig. 5 is a diagrammatic view of the apparatus, showing particularly the electric circuits.

A copper winding or coil 10 is wound on an insulating ring 11, the base of which is cemented to the diaphragm. This coil is in a radial magnetic field provided by the magnetic ring 8 and the lower and upper plates 7 and 4. The annular space 12 is provided between the center post 6 and the surrounding plate 4 to receive the coil 10. Said space is bridged by a lower cover plate 13 of non-magnetic material which defines the lower portion of said space. In order to maintain exact symmetry on the two sides of the diaphragm, a coil 14 and insulating ring 15, similar to the coil 10 and ring 11, are provided. The coils 10 and 14 are energized by an alternating electric current supplied from a generator 16 (Fig. 5). The coil 14, however, does not supply force to the diaphragm since it is not located in a magnetic field.

Each of the insulating rings 11 and 15 is provided with a multiplicity of holes 17 (Figs. 2 and 3), which may be arranged in annular series at the base of the said rings. These holes permit an easy flow of gas between the outer and inner portions of air chambers or spaces 18 and 19 provided on the lower and upper sides respectively of the diaphragm. The upper and lower coils 14 and 10 are connected in series to buck each other, the current in one flowing clockwise while the current in the other flows counter-clockwise. With this arrangement the alternating magnetic fields produced by these coils approximately cancel each other at any distant point so that this magnetic field does not influence microphones or amplifiers in the vicinity. The same amount of heat is generated in the coils on both sides of the diaphragm, thus retaining symmetry even in this regard.

From the center of the chamber 19 a short tubular passageway 20 extends outwardly centrally of the diaphragm and opens at its outer end into a laterally extending duct comprising tubes 21 and 22 telescopically connected. The outer end of the tube 22 opens into a vertical tube 23. In like manner a tubular passageway 24 extends outwardly from the center of the chamber 18 and opens into an air duct comprising tubes 25 and 26. The outer end of the tube 26 opens into a vertical tube 27. The tube 23 opens into a bottle or other container 28 of standard capacity. The mouth of the bottle is sealed by a gasket 29 of rubber or the like mounted on the tube 23. The tube 27 extends downward into a bottle 30, the capacity of which is to be measured. The mouth of the bottle 30 may be sealed by contact with a rubber gasket 31 attached to the tube 27.

A microphone tube 32 extends along the axis of the source tubes 23 and 27 so as to connect right through from the standard bottle 28 to the bottle 30 under test. The tube 32 is made in sections including a central section or sleeve 33 which is telescopically connected with and slidable along the main sections. A rubber tube 34 provides a connection from the microphone tube 32 to a closed chamber in front of the diaphragm of a microphone 35. The microphone may be any one of several well known types, as moving coil, condenser, or piezo-electric. The section 33 is slidable along the tube 32 and thus permits adjustment of the exact point at which the microphone connects with the tube.

The effective length and capacity of the sectional tube 21, 22 are adjustable by means of a plug 36 screw-threaded into the tube section 21 and adjustable lengthwise therein. A screw-threaded plug 37 in the tube section 25 permits adjustment of the effective length and capacity of the tube 25 and 26.

The electrical system connected to the microphone is shown in Fig. 5 and is subject to wide variations without departing from the spirit of my invention. The typical arrangement here shown discloses the microphone 35 connected through a transformer 44 to an input attenuator 45 and thence to a vacuum tube amplifier 46 which feeds a filter or tuned circuit 47 so designed as to pass the fundamental frequency of the gas oscillation, in this case assumed to be, for example, 20 cycles, and attenuate the harmonics thereof, for instance, 40, 60, 80, etc. cycles. The filter 47 feeds a power amplifier 48 which operates an alternating current voltmeter 49 and/or relay 50 which may in turn operate any kind of automatic sorting device for rejecting those bottles whose capacity differs from the standard by more than a predetermined amount. A balancing circuit shown in the lower part of Fig. 5 also connects to the input of the amplifying system and is an accessory which will be described below in connection with a discussion of its function.

The complete mathematical theory of the functioning of my invention has been worked out with the aid of the concept of acoustical mobility by a general method which is explained in a paper which I have published in the Journal of Applied Physics, volume 9, June 1938, pages 373 to 387, entitled "The mobility method of computing the vibration of linear mechanical and accoustical systems: Mechanical-electrical analogies." This mathematical theory can be duplicated by anyone skilled in the art who reads the above mentioned paper. For our present purpose it will be sufficient to explain the action of my invention without the use of mathematics.

When the diaphragm 1 moves upward in Fig. 2, it forces a certain amount of air through tubes 22 and 23 into the bottle 28. At the same time an equal volume of air is drawn through the tubes 26 and 27 from the bottle 30. At the diaphragm vibrates there is therefore an oscillatory flow of air into the bottles 28 and 30, and if the two bottles are of equal capacities, the volume displacements of these two oscillations of gas will be equal in magnitude and exactly opposite in phase. The oscillations of pressure in the two bottles will therefore be equal in magnitude and exactly opposite in phase. The component pressures which each of these bottles feeds to the microphone 35 through the tube 32 will consequently be equal and exactly opposite in phase so that there is no net effective pressure fluctuation at the microphone. This is the same as saying that there is a perfect pressure node at the center of the tube 32.

There are usually two other pressure nodes in the system, namely in the tube 22, 23 and also symmetrically in the tube 26, 27. It is well known that the inertia of the air in the neck of a bottle reacts with the compliance of the air in the body of the bottle to form a "Helmholtz resonator," which, at a certain critical frequency, permits a large oscillatory flow of air through the neck with comparatively small oscillatory pressure applied at the open end of the neck. In the present case the tube 23, 22 serves as an extension of the neck of the bottle and, since the frequency is fixed at 20 cycles per second, there is some length of tube 23, 22 which would cooperate with the bottle volume 28 to give a Helmholtz resonance at the frequency of 20 cycles. A pressure node will therefore be found in the tube 23, 22 at such a distance from the bottle 28 as will give a Helmholtz resonance at 20 cycles; similarly in tube 27, 26. The pressure oscillation amplitude will be a minimum at the node and will rise linearly along the tube to the value which it has in the bottle, and will also rise at an equal rate as one goes toward the diaphragm. Now, since the wave length of a 20 cycle sound is about 56 feet, if the tube 22 were very long, there would be a standing wave in it with pressure nodes every 28 feet, starting from the position of the first node determined above. It is well known that, in a standing wave system in a tube, the volume displacement amplitude of the oscillation of the gas is approximately constant in the neighborhood of a pressure node, varying as a cosine function of the distance from the pressure node as expressed in wave lengths; therefore, since there is a pressure node in the tube 23, 22 and since the wave length is so long compared to the distance from diaphragm 1 to the bottle 28, the volume displacement amplitude of the oscillation of the gas is practically constant throughout the tube 23, 22, is substantially equal to the volume displaced by the diaphragm in its motion, and is independent of small changes in the position of the pressure node in tube 23, 22. The same is true in the other side of the system, tube 27, 26, etc. Consequently, if the bottle 30 is made a little smaller in capacity than the standard bottle 28, the pressure node in tube 27, 26 will move a little farther from the bottle, but the volume displacement into the bottle will remain unchanged and equal to that which the diaphragm motion produces, and the pressure oscillation in the bottle 30 will be increased, with the result that its effect on the microphone will be greater than the bucking pressure oscillation which the microphone receives from the bottle 28, and the microphone will generate an alternating voltage proportional to the amount of the unbalance. Otherwise stated, the perfect pressure node, which existed at the center of tube 32 when the two bottles were of equal size, has now shifted toward the larger bottle and the microphone is therefore subjected to a pressure oscillation whenever the bottle 30 is either larger or smaller than the standard bottle 28.

The voltage generated by the microphone 35, after amplification and filtering, actuates the indicating meter 49 and/or relay 50 which may control an automatic sorting device. Thus my invention permits the automatic sorting of bottles which vary from the standard size by more than a predetermined amount, the actual amount of the size variation required to produce rejection being controlled by the potentiometer 45 which regulates the amount of voltage fed by the microphone to the amplifier. It has been found that a rejection can be produced if the bottle 30 differs in capacity from the bottle 28 by 0.1% of its capacity, this being a very satisfactory accuracy since standard manufacturing tolerances are plus or minus 0.5% approximately.

I have mentioned a frequency of 20 cycles per second as being satisfactory for the operation of my capacimeter and have assumed such a frequency as an example in describing the theory of operation, but this value may be varied through a considerable range subject to choice and depending on the size of the bottles to be measured. In order that any variation from standard size, due to irregularities in the shape of the bottle, may be accurately reflected in the readings, it is desirable that the pressure oscillations within the bottle should be sufficiently slow that the pressure at any instant is the same at all points within the bottle. Only under such a condition will a bulge, for example, near the bottom of the bottle have the same effect on the readings as an equal bulge near the top. The wave length of sound at 20 cycles being 56 feet, this condition is amply fulfilled, even for bottles up to one gallon capacity. Further improvement is brought about by using a standard bottle which not only has the same nominal capacity as the bottle under test, but is of the same nominal shape.

If the air inside the bottle 30 is at a different temperature than the air in bottle 28, the readings of capacity are not affected (except as mentioned below), since the compressibility of a gas depends on its pressuer but is independent of its temperature. A slight effect of temperature differentials has been observed and is due principally to the inertia of the air entering the end of the tube 32. If the air in one bottle is warmer than in the other, it is less dense and its inertia is less where it enters the tube 32, thereby making that end of tube 32 in effect a little shorter, thus moving the pressure node in the tube away from the warmer bottle, as if it were slightly less in capacity than it really is. This temperature effect due to inertia is diminished by operating the equipment at a lower frequency.

Up to this point we have considered the chambers and tubing on the two sides of the diaphragm to be completely symmetrical when bottles of equal capacity are in place, but since the indicating device is so sensitive, a residual pressure oscillation is usually observed at the microphone, even with equal bottles, due to slight assymmetries of construction. A number of adjustments are provided for eliminating this residual unbalance. Two conditions must be met in order that the system should be completely balanced; firstly, the microphone must be connected with the tube 32 exactly at the place where the pressure node is, and secondly, the pressure node must be a perfect node, which can be brought about only by having the pressure oscillations in the two bottles exactly equal. The microphone opening is adjusted to be exactly at the node by moving the sleeve 33 along the tube 32, said sleeve carrying the microphone opening; proper adjustment is indicated by observing a minimum indication on the meter 49.

In order to obtain equality of pressure oscillations in the two bottles of equal capacities, tubes 22 and 26 are provided as above described with branch tubes or extensions 21 and 25 into which the plugs 36 and 37 are threaded. These plugs are normally screwed clear in to about the place where tubes 22 and 26 join the center channels 20 and 24 leading in toward the diaphragm, but if the bottle connected with the tube 22 should have a slightly greater pressure oscillation than the other bottle, the plug in the tube 21 would be backed out part way, thereby providing an added space in connection with the tube 22, into which space a small amount of the volume displacement coming from the diaphragm will pass, thereby reducing the volume displacement into the bottle and the pressure oscillation within it. This adjustment and the adjustment of the sleeve 33 are carried out while watching the indicating meter 49 and a perfect balance can thereby be obtained.

If the diaphragm 1 should not move with an exact simple harmonic motion, there will be pressure oscillations within the system of harmonic frequencies, as 40, 60, 80, etc., in addition to the fundamental frequency of 20 cycles. In making these balancing adjustments, it is usually found that, due to slight assymmetry, those adjustments which produce perfect balance of the fundamental frequency do not at the same time completely balance the harmonics. This results in a failure to produce perfect balance, which would limit the sensitivity of the device. To overcome this difficulty, the amplifier is provided with a filter or tuned circuit which passes the fundamental frequency but has a high attenuation for the harmonic frequencies; this permits a perfect balance to be obtained. A similar result can be obtained by using a microphone whose mechanical system is tuned to the fundamental frequency.

An alternative balancing device, which may also be used in conjunction with the acoustical adjustments described above, is the balancing circuit shown in the lower part of Fig. 5. The purpose of this circuit is to supply to the microphone-amplifier circuit, preferably ahead of the filter, a voltage which is equal in magnitude but opposite in phase to the voltage which is produced at that point by the microphone in response to the unbalanced pressure oscillation. The balancing circuit must therefore be capable of producing a voltage which is adjustable in magnitude and shiftable in phase. Such circuits are well known to those skilled in the art but the circuit shown in Fig. 5 is typical. The alternating current generator 16, which energizes the coils 10 and 14 of Fig. 2, operates through a transformer 54, reversing switch 55, and potentiometer 56 to a bridge circuit consisting of two equal resistors 57 and 58 in series in one arm of the bridge, and a condenser 59 and variable resistor 60 in series in the other arm. The balancing voltage to be impressed on the amplifier is obtained from the two midpoints of these bridge arms, as shown, after passing through the high resistance 61. The phase of the balancing voltage is varied by changing the value of the resistance 60 or by throwing the reversing switch 55, while the magnitude of the balancing voltage is controlled by the potentiometer 56. By operating these controls while watching the meter 49, good balance can be easily obtained.

It can now be seen that the device shown in Figs. 1 and 2 with minor changes will equally well perform its intended function of indicating the differences in capacities between two bottles, if the functions of the microphone and of the source of air oscillations are interchanged as illustrated diagrammatically in Fig. 7. That is to say, if the microphone is of rugged construction, it may be connected to the alternating current generator so that its diaphragm will vibrate and cause an oscillatory flow of air into both bottles in the same phase. Pressure oscillations will thus be established in the bottles, which pressure oscillations will be transmitted to the two sides of the diaphragm of the electromagnetic vibrator E, causing no motion of this diaphragm, if the bottles are of the same capacities. But, if the bottles are of different capacities, there will be larger pressure oscillations in the one than in the other, and these two unequaled pressures arriving on the two sides of the diaphragm 1 will cause it to vibrate. If now the coil 10 is connected to the amplifying system as in Fig. 7, in the place of the microphone 35, the entire device will serve to indicate the capacity of a bottle as before. Thus we may either use a double source (electromagnetic vibrator, Fig. 1) supplying oscillations of opposite phases along with a simple pressure operated microphone 35, or we may use a simple source 35 (Fig. 7), supplying oscillations in the same phases along with the electromagnet device E (Fig. 7) which now functions as a microphone responsive to pressure differential or pressure gradient.

The ends of the tube 32 need not necessarily protrude beyond the ends of the tubes 23 and 27; tube 32 may end flush with the ends of tubes 23 and 27 or it may even be retracted back to the inner ends of tubes 23 and 27. This would result in tubes 23 and 27 and the tube leading into the microphone all being connected together at the central point. Greater sensitivity and greater freedom from the errors due to air temperature are obtained by the construction illustrated in Fig. 1, but the alternative constructions mentioned above would still function.

An alternative form of my invention is shown in Fig. 6, wherein the bottle 30 under test is placed in airtight connection with one end of a tube 63, the other end of which is connected to a source of air oscillations, such as the diaphragm of the electromagnetic vibrator E, vibrated by the alternating current generator 16. It has already been explained that in such an arrangement the Helmholtz resonance of a portion of the air in the tube 63 against the air in the bottle produces a pressure node at some point in the tube. At the position where this pressure node is for a bottle having correct capacity, there is a side tube 34' leading to the microphone 35 which is connected to an amplifier-filter-meter-relay system such as hereinbefore described.

This pressure node is not perfect so an improved balance can be obtained by the use of a balancing circuit similar to the one shown in the lower part of Fig. 5. If the bottle 30 is replaced by one of smaller capacity, the pressure node moves farther from the bottle, while with a larger bottle the pressure node moves closer to the bottle. Thus the microphone will be subjected to an increased pressure oscillation whenever the bottle differs from the standard capacity by more than a predetermined amount. The distance from the bottle end of tube 63 to the pressure node within the tube is well known to be with good approximation $$d = \frac{Ac^2}{4\pi^2 f^2 V}$$

where $d$ is the distance in centimeters, $A$ the cross-sectional area of the tube 63 in square centimeters, $f$ the frequency of the oscillation in cycles per second, $c$ the velocity of wave propagation in centimeters per second, and $V$ is the capacity of the bottle in cubic centimeters. If a different nominal size of bottle is to be inspected, the length of the bottle end of tube 63 is changed so as to bring the pressure node to the microphone when a bottle of the exact capacity is in place.

With either of the balanced capacimeters described above, there is an ambiguity in the indications of absolute capacity since either an increase or decrease of the capacity of the bottle under test above or below the standard capacity produces an increase in the voltage passing through the amplifier. It is often desirable that this should be the case, but if it should be desired to have an unambiguous indication, this can be achieved by operating the device in an unbalanced condition so that the entire range of capacities being measured does not include that capacity which gives balance. This unbalance can be produced by moving any of the adjustments provided for ordinarily producing balance, or by using a standard bottle with the form of apparatus shown in Fig. 1, the bottle having a capacity different from any of those to be measured. With this adjustment my invention becomes a device for sorting bottles larger than a certain capacity from those which are smaller than that capacity, whereas, when operated in the balanced condition, it sorts bottles lying in a certain capacity range from those which are either larger or smaller than the limits of that range.

Various modifications may be resorted to within the spirit and scope of my invention as defined in the appended claims.

I claim:

1. Apparatus for measuring the capacity of a container, which comprises an alternating current generator, electrical means operated by said generator for producing an oscillatory flow of air, means providing a passageway connecting said oscillation producing means to the container, a microphone connected to said passageway at a predetermined point and actuated by oscillations in the air pressure at said point, an electrical indicator connected to said microphone, and means for feeding a controlled alternating voltage from said generator to the circuit of said electrical indicator.

2. Apparatus for measuring the capacity of a container, which comprises an alternating current generator, electrical means operated by said generator for producing an oscillatory flow of air, means providing a passageway connecting said oscillation producing means to the container, a microphone connected to said passageway at a predetermined point and actuated by oscillations in the air pressure at said point, an electrical indicator connected to said microphone, an electrical filter in circuit with the microphone and indicator and operable to attenuate the harmonics of the microphone so that the latter is responsive to the fundamental component only of the alternating voltage which it receives, and means for feeding a controlled alternating voltage from said generator to the circuit of said electrical indicator.

3. Apparatus for measuring the capacity of a container, comprising a diaphragm, means providing air chambers on opposite sides of and separated by the diaphragm, means for vibrating the diaphragm, means providing conduits extending from said chambers respectively to said container and to a standard container, means providing a tubular passageway interconnecting said containers, and indicating means communicating with said passageway for indicating pressure variations therein.

4. Apparatus for measuring the capacity of a container, including means for supporting said container and a container of standard capacity, a tube having its opposite ends extending into the containers and providing a passageway between the containers, an air displacement member, means providing air chambers on opposite sides of and separated by said displacement member, conduits leading from said chambers and opening respectively into said containers, means for reciprocating said displacement member and thereby propagating air pressure waves through said conduits to the containers, and indicating means connected to said tube at a point intermediate said containers.

5. Apparatus for measuring the capacity of a container with reference to a standard container, which comprises an alternating current generator, an electromagnet including a coil situated in a magnetic field and connected to said generator, a displacement element periodically actuated by said coil and causing periodic air displacements on opposite sides of the displacement member, tubular conduits arranged to receive the displaced air and transmit air pressure waves from said element to the said containers respectively, said waves being substantially equal but of opposite phase, means providing a tubular passageway between the containers, and means for indicating pressure variations at a predetermined point in said passageway.

6. Apparatus for comparing the volumetric capacity of a container of unknown capacity with a similar container of standard capacity, said apparatus including a tube having its opposite ends extending into the containers and providing an unobstructed passageway extending from one to the other of the containers, an electromagnetic vibrator, a diaphragm vibrated thereby, tubular conduits through which air pressure waves are transmitted from the diaphragm to said containers, and pressure indicating means communicating with said tube.

7. A capacity measuring apparatus including a diaphragm, plates between which the diaphragm is clamped, said plates formed to provide air chambers on opposite sides of and separated by the diaphragm, coils attached to the diaphragm on opposite sides thereof and connected in series, with one coil opposing the other, means for supplying an alternating current through said coils with the current of one bucking that of the other, one of said plates consisting of magnetic material and the other of non-magnetic material, means for completing a magnetic circuit through said magnetic plate, said magnetic circuit having an air gap into which one of said coils projects, and tubular conduits extending from said chambers through which air pressure waves are transmitted from said chambers.

8. A capacity measuring apparatus including a diaphragm, plates between which the diaphragm is clamped, said plates formed to provide air chambers on opposite sides of and separated by the diaphragm, coils attached to the diaphragm on opposite sides thereof and connected in series, with one coil opposing the other, means for supplying an alternating current through said coils with the current of one bucking that of the other, one of said plates consisting of magnetic material and the other of non-magnetic material, means for completing a magnetic circuit through said magnetic plate, said magnetic circuit having an air gap into which one of said coils projects, tubular conduits extending from said chambers through which air pressure waves are transmitted from said chambers to containers, the capacities of which are to be compared, and means for adjustably varying the effective capacity of said conduits.

9. Apparatus for measuring the capacity of a container, comprising an electrical alternating current generator, means driven by said generator for producing oscillatory flow of air into said container, a microphone actuated by the pressure oscillations within said container and generating alternating voltage in response thereto, an electrical indicator connected to said microphone, and means for feeding a controlled alternating voltage from said generator to the circuit of said electrical indicator.

10. Apparatus for measuring the capacity of a container, comprising an electrical alternating current generator, means driven by said generator for producing oscillatory flow of air into said container, a microphone actuated by the pressure oscillations within said container and generating alternating voltage in response thereto, an electrical indicator connected to said microphone, a filter in circuit between the microphone and said indicator and operable to filter out or attenuate the harmonics of the microphone whereby the latter is responsive to the fundamental component only of the alternating voltage which it receives, and means for feeding a controlled alternating voltage from said generator to the circuit of said electrical indicator.

11. Apparatus for comparing the capacity of one bottle with that of another bottle of standard capacity, said apparatus comprising an alternating current generator, a diaphragm vibrated by current from said generator, means cooperating with the diaphragm for transmitting sound waves from opposite sides of the diaphragm to said bottles respectively, means providing a passageway connecting said bottles through which sound waves are propagated, a microphone in communication with said passageway and operated by pressure impulses in said passageway to produce an alternating current, an electrical indicator connected to said microphone, and means for feeding a controlled alternating voltage from said generator to the circuit of said electrical indicator.

12. Apparatus for comparing the capacity of one bottle with that of another bottle of standard capacity, said apparatus comprising an alternating current generator, a diaphragm vibrated by current from said generator, means cooperating with the diaphragm for transmitting sound waves from opposite sides of the diaphragm to said bottles respectively, means providing a passageway connecting said bottles through which sound waves are propagated, a microphone in communication with said passageway and operated by pressure impulses in said passageway to produce an alternating current, an electrical indicator connected to said microphone, a filter in circuit between the microphone and said indicator and operable to filter out or attenuate the harmonics of the microphone whereby the latter is responsive to the fundamental component only of the alternating voltage which it receives, and means for feeding a controlled alternating voltage from said generator to the circuit of said electrical indicator.

13. Apparatus for comparing the volumetric capacity of two containers filled with gas at equal pressures, which comprises means for introducing into each container a definite mass of gas, means providing a conduit communicating with the interiors of said containers, and means for indicating movement of gas within said conduit.

14. Apparatus for comparing the capacity of two containers which comprises conduits opening into said containers, means for causing an equal mass of gas to flow through each said conduit and thereby changing the pressure within the container by an amount determined by the volumetric capacity of the container, means providing a passageway extending between and communicating with said containers, and means to indicate a movement of gas through said passageway.

15. Apparatus for measuring the capacity of a container, which comprises a tube arranged to extend into the container, automatic means for producing a rapid sustained oscillatory flow of air through the tube into and out of the container and thereby producing pressure fluctuations within the container, means providing a passageway communicating with the container and in which air oscillations are produced by said pressure fluctuations, and an indicating device communicating with said passageway at a predetermined point therein and indicating air pressure fluctuations at said point.

16. Apparatus for measuring the capacity of a container, which comprises a tube having an open end arranged to extend into the container, means for producing an oscillatory flow of air through said tube into and out of the container and thereby producing pressure fluctuations therein, a second tube providing a passageway communicating with the container and in which air oscillations are produced by said pressure fluctuations, means providing a seal between the container and said tubes and preventing movement of air into or out of the container apart from said tubes, and a microphone connected to said second tube at a predetermined point and actuated by oscillations in the air pressure at said point.

17. Apparatus for measuring the capacity of a container, which comprises a tube having an open end arranged to extend into the container, means for producing an oscillatory flow of air through said tube into and out of the container and thereby producing pressure fluctuations therein, a second tube providing a passageway communicating with the container and in which air oscillations are produced by said pressure fluctuations, means providing a seal between the container and said tubes and preventing movement of air into or out of the container apart from said tubes, a microphone connected to said second tube at a predetermined point and actuated by oscillations in the air pressure at said point, an amplifier connected to said microphone, and an electrical indicator connected to the amplifier.

18. Apparatus for measuring the capacity of a container, which comprises automatic means for causing periodic pressure fluctuations in the container at regular intervals of a frequency of many times a second and an intensity inversely proportional to the capacity of the container, automatic means for concomitantly causing similar fluctuations of the air pressure within a standard container but of opposite phase, a tube extending between said containers and providing intercommunication therebetween, and indicating means connected at an intermediate point to said tube for indicating pressure fluctuations at said point, said indicating means including a microphone, a transformer having a primary connected in circuit with the microphone, an input attenuator in circuit with the secondary of the transformer, an amplifier connected in circuit with the attenuator and energized by current supplied from the transformer, a filter electrically connected to the amplifier and designed to pass the fundamental frequency of the oscillations supplied from the microphone, and a volt meter in circuit with the filter.

19. Apparatus for comparing the capacities of two containers, comprising a device for producing a sustained series of air impulses or vibrations, a device responsive to air vibrations, means providing intercommunicating passageways between said containers and between each of said devices and said containers, and an indicator connected to said passageway between the said containers.

20. Apparatus for measuring the capacity of a container, which comprises an alternating current generator, electrical means operated by said generator for producing an oscillatory flow of air, a microphone responsive to air pressure oscillations, means providing intercommunicating air passageways connecting said container, said electrical means and said microphone, an electrical indicator connected to said microphone, and means for feeding a controlled alternating voltage from said generator to the circuit of said electrical indicator.

21. Apparatus for comparing the capacities of two containers, comprising a diaphragm, means providing air chambers on opposite sides of and separated by the diaphragm, means providing conduits extending from said chambers respectively to said containers, means providing a tubular passageway interconnecting said containers, means for producing air pressure oscillations and transmitting said oscillations to said tubular passageway at a predetermined point therein, and means indicating vibrations of said diaphragm.

22. A device for measuring the capacity of a container, comprising automatic means for imparting an oscillating pressure to the gas within the container by periodically introducing masses of gas of controlled amount into the container at automatically controlled regular intervals of a frequency of many per second and thereby causing uniform periodic pressure changes of said frequency in the mass of gas within the container, and indicating means actuated by and dependent on a multiplicity of said pressure changes to indicate said capacity.

23. Apparatus for measuring the volumetric capacity of a container, which comprises automatic means for causing a periodic increase and decrease in controlled amounts of the mass of air within the container at regular intervals corresponding in frequency to sound vibrations and thereby causing pressure variations within the container inversely proportional to the capacity of the container, capacity indicating means, and means responsive to and dependent upon a sustained series of said pressure vibrations to cause the said indicating means to indicate the said capacity of the container.

24. Apparatus for measuring the capacity of a container, which apparatus comprises automatic means for producing an oscillatory flow of air at a rate of oscillation of the order of sound vibrations, a conduit having one end extended into the interior of the container and providing a passageway connecting said oscillation producing means to the container, means for effecting a seal between the conduit and container and thereby preventing the escape of air from the container to the outside air, and a microphone connected to said conduit at a predetermined point and actuated by oscillations in the air pressure at said point.

25. Apparatus for measuring the capacity of a container, which comprises a standard container, automatic means for causing periodic pressure fluctuations in both said containers simultaneously at regular intervals of a frequency of many times a second, the frequency being equal in said containers and the pressure fluctuations inversely proportional to the capacities of the respective containers, said pressure fluctuations being of equal magnitude in both containers when the capacities of the containers are equal, but of opposite phase, a tube extending between said containers and providing intercommunication therebetween, and indicating means connected at an intermediate point to said tube for indicating pressure fluctuations at said point.

26. Apparatus for measuring the capacity of a container, which comprises a standard container, automatic means for causing periodic pressure fluctuations in both said containers simultaneously at regular intervals of a frequency of many times a second, the frequency being equal in said containers and the pressure fluctuations inversely proportional to the capacities of the respective containers, said pressure fluctuations being of equal magnitude in both containers when the capacities of the containers are equal, but of opposite phase, a tube extending between said containers and providing intercommunication therebetween, and indicating means connected at an intermediate point to said tube for indicating pressure fluctuations at said point, said indicating means including a microphone, amplifying means connected to the microphone, and an indicator connected to said amplifying means.

27. Apparatus for comparing the capacity of two confined spaces which comprises a conduit for interconnecting said spaces, means for applying periodic pressure waves of opposite phase to said spaces, and thereby producing a fluctuating pressure within said conduit, the intensity of which pressure differs at different points along the passageway and is dependent at any said point on the relative capacities of said spaces, and a pressure indicator at a predetermined point along said passageway.

28. Apparatus for measuring the capacity of a container, said apparatus comprising a conduit providing an inter-communicating passageway between said container and a container of standard capacity, means for causing an oscillatory flow of air into and out of said containers concomitantly and thereby causing small masses of air to be carried into and out of each container at a predetermined frequency whereby periodic variations of the air pressure are produced in each container inversely proportional to the capacity of the container and thereby causing a harmonic pressure vibration within said passageway and producing a node at a point in said passageway determined by the relative pressures produced in the containers, and means for indicating the presence or absence of said node at a predetermined point in said passageway.

29. Apparatus for comparing the capacity of two gas-filled containers, which comprises means for changing the amount of gas in each container by transferring a controlled definite mass of gas between the interior and exterior of the container and thereby changing the pressure within each container by an amount proportional to the volumetric capacity of the container, a conduit communicating with the interiors of the containers and providing a means for directing a movement of gas therethrough between said containers, and means for indicating movement of gas through said conduit.

30. Apparatus for comparing the capacity of one container with that of a similar container of standard capacity, which comprises means providing two chambers, apparatus for producing an oscillatory flow of equal masses of gas to and from each of said chambers, conduits arranged to direct the flow from said chambers to the said containers respectively and thereby causing the gaseous pressure within each said container to be varied periodically to a degree inversely proportional to the volumetric capacity of the container, said oscillations being of opposite phase and thereby producing pressure waves of opposite phase in the containers, means for propagating said waves from the containers in a path extending from one to the other of the containers and thereby producing a node at a point in said path dependent upon the relative capacities of said containers, and means for indicating the pressure at the point in said path at which said node would be produced if the containers were of equal capacity.

FLOYD A. FIRESTONE.